US010146296B2

(12) United States Patent
Gainey et al.

(10) Patent No.: US 10,146,296 B2
(45) Date of Patent: Dec. 4, 2018

(54) INDEPENDENT ASYNCHRONOUS FRAMEWORK FOR EMBEDDED SUBSYSTEMS

(71) Applicant: QUALCOMM Incorporated, San Diego, CA (US)

(72) Inventors: Kenneth Gainey, San Diego, CA (US); Eunjoo Hwang, San Jose, CA (US); Karthik Reddy Neravetla, San Jose, CA (US); Jen-Jung Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/535,183

(22) Filed: Nov. 6, 2014

(65) Prior Publication Data

US 2016/0132097 A1 May 12, 2016

(51) Int. Cl.
*G06F 1/32* (2006.01)
*G06F 1/00* (2006.01)
*G06F 1/26* (2006.01)

(52) U.S. Cl.
CPC .......... *G06F 1/3296* (2013.01); *G06F 1/32* (2013.01); *G06F 1/324* (2013.01); *G06F 1/3206* (2013.01); *G06F 1/3209* (2013.01); *G06F 1/3287* (2013.01); *Y02B 60/1282* (2013.01); *Y02B 60/32* (2013.01); *Y02D 10/171* (2018.01); *Y02D 50/20* (2018.01)

(58) Field of Classification Search
None
See application file for complete search history.

(56) References Cited

U.S. PATENT DOCUMENTS

| 8,635,572 | B1 | 1/2014 | Jin et al. | |
|---|---|---|---|---|
| 2008/0307240 | A1 | 12/2008 | Dahan et al. | |
| 2009/0199023 | A1 | 8/2009 | Lee et al. | |
| 2009/0204835 | A1 | 8/2009 | Smith et al. | |
| 2010/0153765 | A1* | 6/2010 | Stemen | G06F 1/3203 713/340 |
| 2010/0318816 | A1 | 12/2010 | Chi et al. | |
| 2011/0093733 | A1 | 4/2011 | Kruglick | |
| 2012/0041631 | A1* | 2/2012 | Wang | F02D 41/22 701/29.1 |
| 2013/0124895 | A1 | 5/2013 | Saha et al. | |
| 2015/0139056 | A1* | 5/2015 | Wang | H04W 48/08 370/311 |

(Continued)

FOREIGN PATENT DOCUMENTS

WO WO-2014078482 A1 5/2014

OTHER PUBLICATIONS

Gammie G., et al., "SmartReflex Power and Performance Management Technologies for 90 nm, 65 nm, and 45 nm Mobile Application Processors", Proceedings of the IEEE, New York, US, vol. 98, No. 2, Feb. 28, 2010 (Feb. 28, 2010), XP011300404, pp. 144-159, ISSN: 0018-9219.

(Continued)

*Primary Examiner* — Tanh Nguyen
(74) *Attorney, Agent, or Firm* — Haynes and Boone, LLP

(57) ABSTRACT

An integrated circuit is provided with an independent power framework for a first subsystem and another independent power framework for a processor subsystem that receives messages from the first subsystem.

9 Claims, 3 Drawing Sheets

(56) References Cited

U.S. PATENT DOCUMENTS

| | | | | |
|---|---|---|---|---|
| 2015/0281374 A1* | 10/2015 | Petersen | ............... | H04L 67/12 |
| | | | | 709/223 |
| 2016/0132097 A1* | 5/2016 | Gainey | ............... | G06F 1/324 |
| | | | | 713/323 |
| 2016/0329987 A1* | 11/2016 | Pang | ............... | H04L 1/0045 |

OTHER PUBLICATIONS

International Search Report and Written Opinion—PCT/US2015/056239—ISA/EPO—dated Feb. 19, 2016.
Mair H., et al., "A 65-nm Mobile Multimedia Applications Processor with an Adaptive Power Management Scheme to Compensate for Variations", 2007 IEEE symposium on VLSI Circuits, Piscataway, NJ, USA, Jun. 30, 2007 (Jun. 30, 2007), pp. 224-225, XP031142417, ISBN: 9-784-900784-04-8.

* cited by examiner

INDEPENDENT ASYNCHRONOUS FRAMEWORK FOR EMBEDDED SUBSYSTEMS

TECHNICAL FIELD

This application relates to power supplies for an embedded subsystem, and more particularly to an embedded subsystem having an independent asynchronous power supply.

BACKGROUND

System on a chip (SOC) integrated circuits include assorted subsystems. For example, a smart phone SOC may integrate a modem, a graphics processor, Bluetooth, WiFi, and other subsystems. Each of these subsystems will typically have different timing with regard to entering sleep mode, active mode, or shutdown during operation of the SOC. To enable the subsystems to operate independently with regard to these various modes of operation, it is conventional to power gate the subsystems. If a subsystem is to be powered down, it may then be isolated from a common power rail for the remaining subsystems.

SOCs will typically have two power rails: a memory power rail and also a core logic power rail. The memory power rail provides the power supply voltage to the various embedded memories for the subsystems. In contrast, the core logic power rail provides the power supply voltage to the logic gates. In general, the voltage levels required by embedded memories are different from those required by the core logic for the subsystems. In that regard, it is conventional for both embedded memories and the core logic in the subsystems to be able to shift into a sleep mode, which may also be designated as a retention mode. But embedded memories require a higher power supply voltage to retain their stored values as compared to the reduced power supply voltage that may be used to power logic gates in a sleep mode. If a common power rail were used for both the embedded memories and the core logic, the core logic would waste power during the sleep mode from, for example, unnecessary leakage current loss due to the elevated power supply voltage that would be required to maintain the stored states in the embedded memories. Having independent memory and core logic power rails thus saves power.

Although independent memory and core logic power rails allow the various mode voltages to be optimized for memory and logic operation, power gets wasted from the asynchronous nature of the operating modes for the various subsystems. For example, a WiFi subsystem may need to wake up approximately every 100 ms to check for any incoming messages. The memory power rail and the core logic power rail will then need to be powered so that the WiFI subsystem may wake up accordingly. But these power rails couple to clock trees and other structures in the powered-down subsystems that then lose power through leakage currents.

Accordingly, there is a need in the art for improved power architectures for integrated circuits including a processor subsystem and other subsystems that must interface with the processor subsystem such as through messaging.

SUMMARY

An integrated circuit such as an SOC is provided that includes a processor subsystem and a first subsystem. The SOC also includes an always-on power domain in which the core logic power supply is maintained at a nominal level. In contrast, the first subsystem includes core logic that is powered by a first subsystem core logic power rail that may be driven with either retention or nominal voltages depending upon whether the first subsystem is operating in a sleep mode or in a nominal (active) mode of operation. Similarly, a processor core logic power rail powers core logic in the processor subsystem with either retention or nominal voltages depending upon whether the processor subsystem is operating in a sleep mode or in a nominal (active) mode of operation. The respective power domains in the first subsystem and in the processor subsystem as defined by the corresponding core logic power rails are independent. In this fashion, the first subsystem may be transitioned from the sleep mode to the nominal mode of operation while the processor subsystem remains in a sleep mode.

Such an independent power domain for the first subsystem is quite advantageous as it eliminates considerable latency and power consumption issues associated with conventional SOC power domain frameworks. In particular, it was conventional for a first subsystem such as a WiFi subsystem to depend upon a shared core logic power rail with the processor subsystem. The processor subsystem would thus have to transition to the nominal mode of operation just so that the WiFi subsystem could check for messages. In contrast, the advantageous power framework disclosed herein enables the processor subsystem to remain in sleep mode while the first subsystem transitions to the nominal mode of operation.

These features may be better appreciated from the following detailed description of example embodiments.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
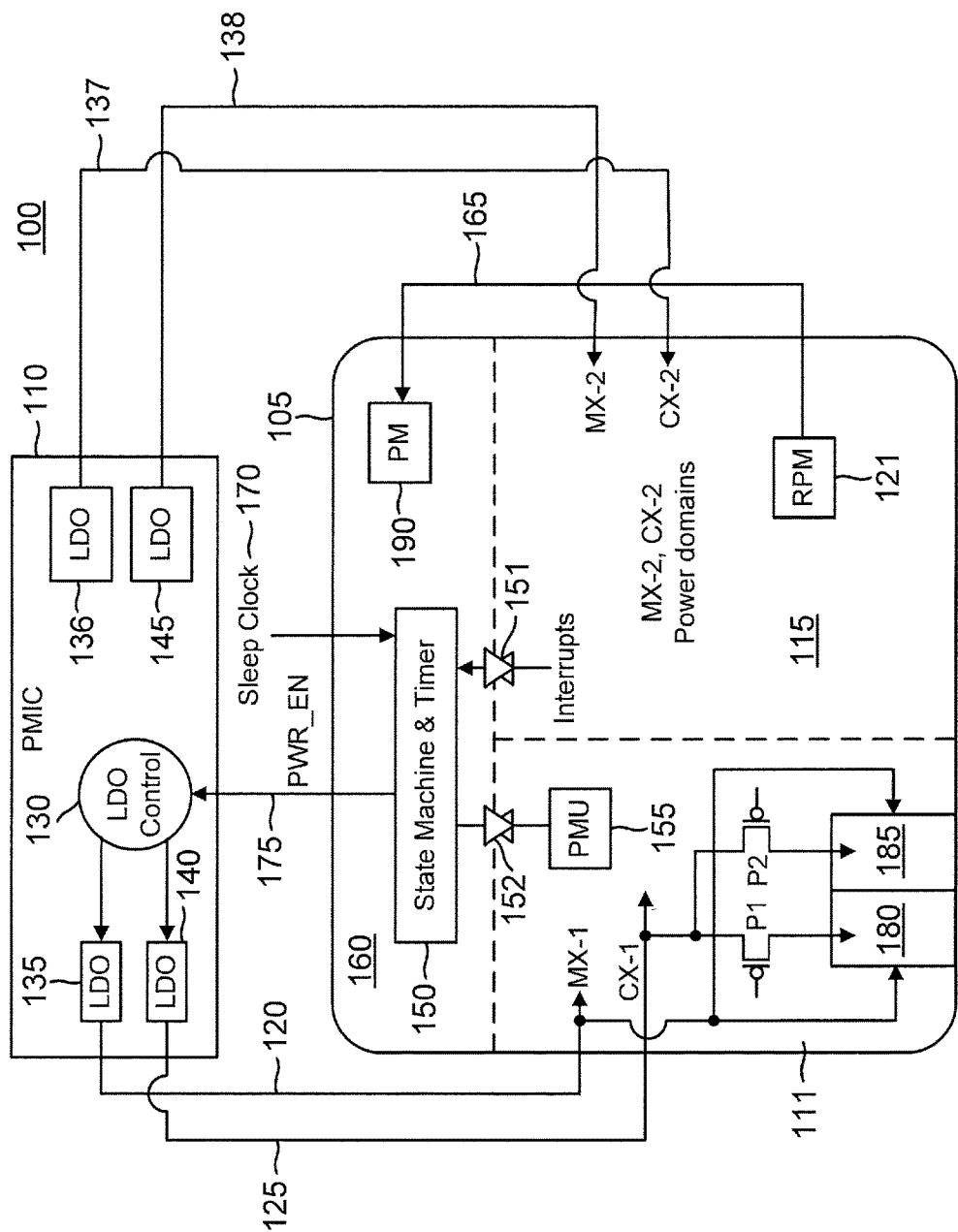
FIG. 1 is a block diagram of an example system including a power management integrated circuit (PMIC) and a system-on-a-chip (SOC) including a subsystem having an asynchronous and independent power framework with regard to the power framework for a processor subsystem for the SOC.

A system-on-a-chip (SOC) integrated circuit is provided that includes a first subsystem core logic power rail for a first subsystem that interfaces with a processor subsystem. An independent processor core logic power rail powers the processor subsystem. Embedded memories for the first subsystem are powered by a first subsystem memory power rail that is independent from a processor memory rail that powers embedded memories for the processor subsystem. Both the first subsystem and the second subsystem may enter sleep modes in which the voltages for the corresponding core logic power rails are independently collapsed to individual retention values. Similarly, the voltages for the memory power rails are collapsed to individual retention values during the respective sleep mode. In a regular or nominal mode of operation for the subsystems, the voltages for the first subsystem and processor core logic power rails as well as for the first subsystem and processor memory power rails would be raised to individual nominal values. A power management integrated circuit (PMIC) powers the various power rails in both the nominal and sleep modes. The SOC includes an always-on power domain powered by a logic power rail that is not collapsed regardless of whether the first or second subsystems are operating in a sleep mode. In other words, there is no sleep mode for the always-on power domain. A processor power manager in the always-on domain manages the transition of the power rails for the processor subsystem by interfacing with a corresponding processor resource manager within the processor subsystem. Note that such management of the processor subsystem through a processor power manager in the always-on domain is conventional.

In a conventional SOC, a common core logic power rail and a common embedded power rail are both shared by the processor subsystems with various other subsystems such as a WiFi subsystem, a graphics subsystem, and sensors. Given this conventional sharing of the common power rails, it was the role of the processor resource manager to "aggregate votes." In other words, each of the various subsystems would, when operating in a nominal mode, communicate their status as to when they will enter sleep mode and as to when they need to wake up from sleep mode. If each subsystem indicates that it is entering sleep mode and if no other tasks remain to be performed by the processor subsystem, the processor resource manager could then initiate the entry of the processor subsystem itself into sleep mode. But as part of its vote aggregating function, the resource manager determined the earliest time when the next subsystem (or itself) needs to be transitioned from the sleep mode to the nominal mode. This wakeup time is monitored by the processor power manager responsive to a sleep clock. The processor power manager interfaces with the PMIC with regard to collapsing the common power rail and the common embedded memory rail to the retention voltage value. At the same time, the processor power manager maintains a timer using the sleep clock so that it may determine when the processor resource manager should be woken up (transitioned to nominal mode). Upon completion of the sleep period as determined by the timer using the sleep clock, the processor power manager issues a command to the PMIC to transition the voltages for the common rails to their nominal values. With the common rails settled to their nominal values, the processor power manager may then wake up the processor resource manager. In turn, the processor resource manager may then wake up any necessary subsystems at that time.

Although such operation of the processor power manager in the always-on domain as well as the operation of the processor resource manager in the processor subsystem is conventional, it leads to excessive power consumption and delay/latency. For example, in one embodiment the first subsystem may comprise a WiFi subsystem. As known in the WiFi arts, a WiFi subsystem may need to transition from the retention mode (sleep mode) to the nominal mode fairly regularly such as approximately every 100 ms to check for any messages. In a conventional system with shared power and memory rails, much delay is then encountered in "bringing up the battleship" with regard to waking up the processor subsystem and powering the common power rails just so that the WiFi subsystem may check for messages. In addition to the delay, the processor subsystem then wastes power through leakage currents. In contrast, the SOC disclosed herein eliminates this latency and power consumption by providing a first subsystem always-on (AON) power manager in the always-on power domain and a corresponding first subsystem power management unit (PMU) in the first subsystem power domain. These modules manage the voltages (retention or nominal) on the first subsystem core logic power rail and the first subsystem embedded memory power rail. The first subsystem AON power manager interfaces with the PMIC to control whether the voltages on the first subsystem core logic power rail and the first subsystem embedded memory power rail are in the retention or nominal states. The first subsystem PMU interfaces with the first subsystem AON power manager to communicate when the first subsystem should be transitioned from the sleep mode to the nominal mode. The first subsystem AON power manager has its own timer (or timers) to measure the desired sleep period for the first subsystem responsive to a sleep clock. Upon expiration of the desired sleep period, the first subsystem AON power manager commands the PMIC to raise the voltages on the first subsystem power rails (both for the core logic and for its embedded memories) to their nominal values. The first subsystem AON power manager may then command the first subsystem PMU to transition into the nominal mode of operation. In this fashion, the latency and power consumption issues that vexed the prior art are eliminated. In one embodiment, the first subsystem AON power manager may be deemed to comprise a means for controlling whether a voltage of the first subsystem core logic power rail and a voltage for the first subsystem memory power rail both equal retention values or nominal values responsive to whether the first subsystem is to transition into a sleep mode or into a nominal mode of operation, the means for controlling being independent from whether the processor subsystem is in a sleep mode or in a nominal mode of operation.

The advantageous features of the first subsystem power management may be better appreciated through the following discussion of some example embodiments. Turning now to the drawings, FIG. 1 illustrates an example system 100 including an SOC 105 and a PMIC 110. SOC 105 includes an always-on (AON) power domain 160, a processor subsystem 115, and a first subsystem 111. A first subsystem core logic power rail (CX-1) 125 powers the core logic within first subsystem 111. Similarly, a first subsystem memory power rail (MX-1) 120 powers the embedded memories within first subsystem 111. PMIC 110 includes a linear dropout regulator (LDO) 135 that drives first subsystem memory power rail 120 with either a retention voltage or a nominal voltage depending upon whether first subsystem 110 is in the sleep mode or in the nominal mode of operation. Similarly, PMIC 110 includes an LDO 140 that drives first subsystem power rail 125 with either a retention voltage or a nominal voltage depending upon whether first subsystem 111 is in the sleep mode or in the nominal mode of operation.

The particular values for the retention voltages (used in sleep mode) and the nominal voltages (used in nominal mode) depend upon the process node. In general, the nominal value is higher than the retention value so that power is saved during the sleep mode. Within the sleep mode, the retention voltage for first subsystem core logic power rail 125 may be different (or the same) from the retention voltage for first subsystem memory power rail 120. Similarly, the nominal voltages for these rails may also differ. PMIC 110 includes an LDO control module 130 that controls the voltages driven by LDO 135 and LDO 140 responsive to a power enable (PWR_EN) signal 175 from a first subsystem AON power manager 150 in AON domain 160. Advantageously, power enable signal 175 may comprise just a single bit such that SOC need only dedicate one corresponding input/output (I/O) pin (not illustrated) to accommodate power enable signal 175. In alternative embodiments, power enable signal 175 may comprise a multi-bit signal. First subsystem AON power manager 150 asserts power enable signal 175 (such as by driving it to a power supply voltage) when first subsystem 111 is to transition from the sleep mode to the nominal mode of operation. Conversely, first subsystem AON power manager 150 de-asserts power enable signal 175 when first subsystem 111 is to transition from the nominal mode to the sleep mode of operation.

With regard to asserting power enable signal 175, first subsystem AON power manager 150 includes a timer (discussed further with regard to FIG. 2 below) that determines an elapsed time responsive to counting cycles of a sleep clock 170. Prior to the transition to sleep mode, a first subsystem power management unit (PMU) 155 transmits the time to first subsystem AON power manager 150 identifying when first subsystem 111 should be transitioned back to the nominal mode. Alternatively, first subsystem PMU 155 may transmit the length of the subsequent sleep mode period to first subsystem AON power manager 150. Based upon the identified time (or length of the sleep period), first subsystem AON power manager may then configure its timer accordingly so as to wakeup first subsystem 111 upon the expiration of the current sleep mode period. Note that the power rail voltage(s) for AON power domain 160 are independent from the nominal (or retention) voltages for first subsystem power rails 120 and 125. Thus, PMU 155 communicates with first subsystem AON power manager 150 through a level shifter 152 to accommodate the different voltages used in these independent voltage domains.

PMU 155 comprises a state machine that manages the transition of first subsystem 111 into the sleep and nominal modes of operation. For example, first subsystem 111 may comprise a WiFi subsystem that includes a first WLAN subsystem 180 and a second WLAN subsystem 185. Each WLAN subsystem may be dedicated to a corresponding bandwidth and includes the circuitry for performing the physical (PHY) and media access control (MAC) layers. WLAN subsystems 180 and 185 receive their core logic power through a switched path to first subsystem core logic power rail 125. For example, first subsystem core logic power rail 125 may couple through a PMOS transistor P1 to first WLAN subsystem 180 and through a PMOS transistor P2 to second WLAN subsystem 185. Embedded memories (not illustrated) for each of these WLAN subsystems directly receive power from a first subsystem memory power rail 120. As part of the transition to a sleep mode, first subsystem PMU 155 switches off transistors P1 and P2 to completely discharge the portions of first subsystem core logic power rail 125 that power the core logic within these subsystems. Such a complete collapse eliminates any leakage current loss for the core logic in WLAN subsystems 180 and 185. Various modules in other embodiments may have their portions of first subsystem core logic power rail 125 completely collapsed in this fashion by first subsystem PMU 155.

A processor subsystem core logic power rail (CX-2) 137 powers core logic within processor subsystem 115. Similarly, a processor subsystem memory power rail (MX-2) 138 powers embedded memories within processor subsystem 115. As is conventional, power rails 137 and 138 may be shared by other subsystems (not illustrated) that interface with processor subsystem 115. For example, a graphics processor subsystem, a Bluetooth subsystem, and sensors may have their core logic powered by processor subsystem core logic power rail 137. In addition, embedded memories in these subsystems may be powered by processor subsystem memory power rail 138. With regard to these shared rails, a resource power manager (RPM) 120 within processor subsystem 115 "aggregates votes" as discussed earlier. In that regard, the subsystems that share power rails 137 and 138 with processor subsystem 115 signal when they need to be transitioned into the nominal mode of operation to RPM 120. If all these subsystems indicate that they are transitioning to sleep mode and there are no other tasks to perform, RPM 120 may begin a transition to sleep mode itself by signaling when it needs to be transitioned back to nominal mode to a processor subsystem power manager (PM) 190 within AON power domain 160. Processor subsystem 190 may then manage the transition of processor subsystem power rails 137 and 139 to their retention values. In that regard, PMIC 110 may include an LDO 136 for driving processor subsystem core logic power rail 137 with either the retention or nominal voltages. Similarly, PMIC 110 may include an LDO 145 for driving processor subsystem memory power rail 1378 with either the retention of nominal voltage (these voltages being independent from the corresponding voltages on power rail 137).

With regard to the production of the nominal and retention voltages, it would be inefficient to use an LDO to regulate a battery voltage down to the considerably lower nominal or retention values. A switching power supply (not illustrated) within PMIC 110 may thus regulate the battery voltage down to an intermediate value. LDOs 135, 140, 136, and 145 may then regulate this intermediate voltage to the appropriate nominal and retention voltages. PM 190 controls the regulation by 136 and 145 in a conventional fashion. This is quite advantageous in that PM 190 and RPM 120 need not be re-engineered to accommodate the independent first subsystem power domain.

Figure 2:
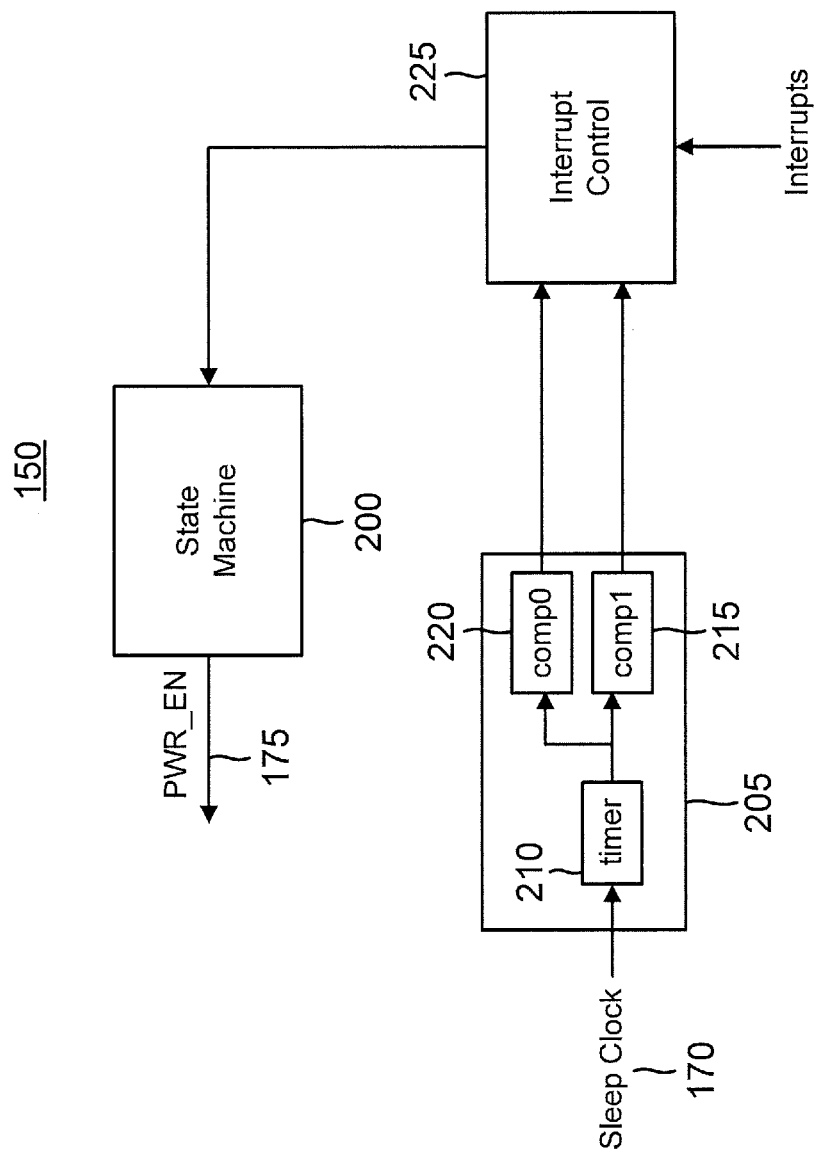
FIG. 2 is a block diagram of an always-on (AON) power manager for the subsystem of FIG. 1.

During operation in the nominal mode, processor subsystem 115 may need to command first subsystem 111 to transition from the sleep mode to the nominal mode of operation. For example, if first subsystem 111 is a WiFi subsystem, processor subsystem 115 may have messages it needs to send through WiFi. As seen in FIG. 2, first subsystem AON power manager 150 includes an interrupt control module 225 to accommodate interrupts from, for example, processor subsystem 115. Referring again to FIG. 1, the interrupts may be level-shifted through a corresponding level-shifter 151 because the AON power domain 160 uses a power supply voltage that is independent of the core logic nominal voltage for processor subsystem 115. In that regard, additional level-shifters (not illustrated) would similarly level-shift additional signals that may be exchanged between the first subsystem 111 and processor subsystem 115. Upon receipt of an interrupt as shown in FIG. 2, interrupt control module 225 signals a state machine 200 within first subsystem AON power manager 150 to assert power enable signal 175. As discussed earlier, LDO control module 130 in PMIC 110 responds to the assertion of power enable signal 175 by commanding LDOs 135 and 140 to drive their power rail with the nominal voltage. When the nominal voltages are stabilized on rails 120 and 125, state machine 200 may then trigger PMU 155 to transition first subsystem 111 into the nominal mode of operation. In a WiFi embodiment, PMU 155 may then power up the appropriate WLAN interface depending upon the desired frequency band by switching on PMOS transistor P1 and/or PMOS transistor P2.

To accommodate the operation of different subsystems within first subsystem 111 (e.g., WLAN interfaces 180 and 185), first subsystem AON power manager 150 may monitor corresponding counters such as a zeroth counter (comp0)

220 and a first counter (comp1) 215. These counters count cycles of sleep clock 170 through a timer 210. Sleep clock 170 may be produced by PMIC 110, AON power domain 160, or another suitable independent source. The counts for counters 215 and 220 are set depending upon when the corresponding subsystem within first subsystem 111 need to transition to nominal mode. In that regard, PMU 155 transmits the corresponding times when it needs to transition to nominal mode (or equivalently, the duration of the corresponding sleep periods) to first subsystem AON power manager 150 so that the corresponding counts within counters such as counters 215 and 220 may be set accordingly. It will be appreciated that the number of counters may be varied from one to however many are required for the various subsystems within first subsystem 111 that require independent wakeup times. When a counter such as counter 220 or 215 indicates that the sleep period for first subsystem 111 has expired, the corresponding counter triggers interrupt control module 225 to in turn trigger state machine 200 to assert power enable signal 175 to begin the transition of first substem 111 into the nominal mode.

In a WiFi subsystem embodiment, PMU 155 awakens the appropriate WLAN interface(s) so that they may check whether a received traffic indication map (TIM) bit in the corresponding frequency band has been asserted. If the TIM bit is zero (or TIM bits if multiple WLAN modules are active), PMU 155 can schedule the next wakeup time with first subsystem AON power manager 150. If the TIM bit is asserted (equaling binary one), WiFi subsystem 111 will proceed to interface with processor subsystem 115 so that the message is received and processed. If, however, processor subsystem 115 were in the sleep mode, first subsystem 111 may transmit an interrupt (not illustrated) to processor subsystem power manager 190 in AON power domain 160. Processor subsystem power manager 190 would then signal ASIC 110 so that LDOs 136 and 145 drive their respective power rails 137 and 138 with the corresponding nominal voltages. Processor subsystem power manager 190 would then trigger RPM 120 to transition processor subsystem 115 into the nominal (which may also be denoted as the active) mode of operation. An example method of operation for an SOC including a first subsystem having independent power rails will now be discussed.

Figure 3:
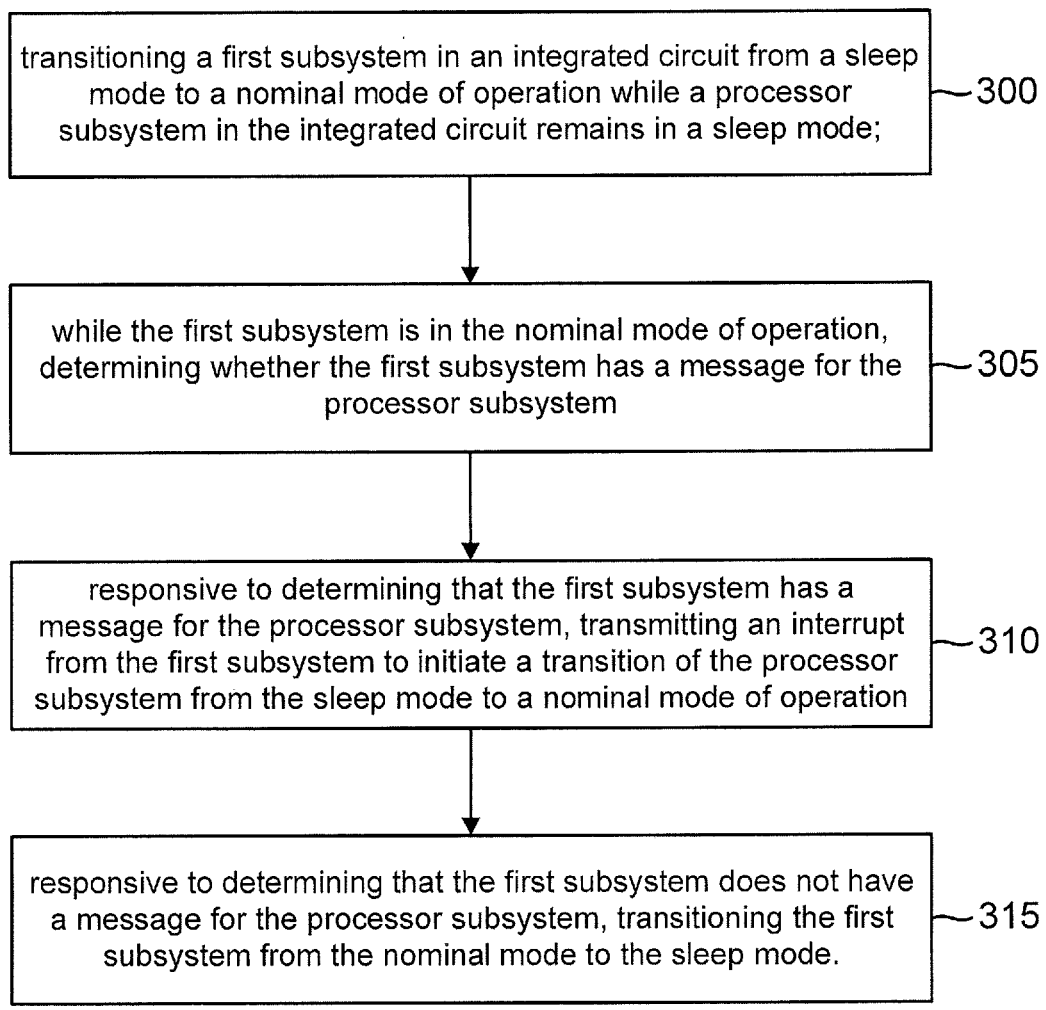
FIG. 3 is a flowchart for a method of operating the SOC of FIG. 1.

FIG. 3 is a flowchart for an example method of operation. An act 300 comprises transitioning a first subsystem in an integrated circuit from a sleep mode to a nominal mode of operation while a processor subsystem in the integrated circuit remains in a sleep mode. An example of such an act is discussed above with regard to transitioning first subsystem 115 into the nominal mode so that WLAN 180 and/or WLAN 185 can check the status of the corresponding Traffic Indication Map (TIM) bit.

The method also includes an act 305 comprising determining whether the first subsystem has a message for the processor subsystem while the first subsystem is in the nominal mode of operation. In a WiFi embodiment, such a message would be pursuant to the corresponding received TIM bit being asserted. However, it will be appreciated that other types of subsystems that may need to interact with a processor subsystem through messaging may also advantageously use the independent power framework disclosed herein.

The method further includes an act 310 comprising transmitting an interrupt from the first subsystem to initiate a transition of the processor subsystem from the sleep mode to a nominal mode of operation responsive to a determination that the first subsystem has a message for the processor subsystem. An example of such an act is the transmission of an interrupt from the first subsystem 111 to processor subsystem power manager 190 that in turn triggers the transition of processor subsystem 115 to the nominal mode of operation.

Finally, the method includes an act 315 comprising transitioning the first subsystem from the nominal mode to the sleep mode of operation responsive to a determination that the first subsystem does not have a message for the processor subsystem. An example of such an act would be pursuant to WLAN 180 and/or WLAN 185 determining that the received corresponding TIM bit was de-asserted (equaling logic zero). In such a case, PMU 155 would transmit the appropriate wakeup time (or times) to first subsystem AON power manager 150 in the AON power domain 160. First subsystem AON power manager 150 would then de-assert power enable signal 175 so that the LDOs 135 and 140 would drop the voltages on their respective power rails 120 and 125 to the corresponding retention values. First subsystem 111 would then transition into the sleep mode of operation.

In light of the numerous alternative embodiments, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. An integrated circuit, comprising
a WiFi subsystem including core logic coupled to a WiFi subsystem core logic power rail and embedded memories coupled to a WiFi subsystem memory power rail, wherein the WiFi subsystem core logic includes a WiFi subsystem power manager unit (PMU);
a processor subsystem including core logic coupled to a processor core logic power rail and embedded memories coupled to a processor memory power rail; and
an always-on (AON) power domain including a WiFi subsystem always-on power manager (AON-PM), wherein the WiFi subsystem AON-PM is configured to control a voltage for the WiFi subsystem core logic power rail and a voltage for the WiFi subsystem memory power rail depending upon the whether the WiFi subsystem is to operate in a sleep mode or in a nominal mode of operation, and wherein the WiFi subsystem PMU is configured to transmit a wakeup period to the WiFi subsystem AON-PM prior to a transition of the WiFi subsystem to the sleep mode and wherein the WiFi subsystem AON-PM is further configured to time the wakeup period responsive to a sleep clock and signal the end of the wakeup period to the WiFi subsystem PMU to begin a transition of the WiFi subsystem from the sleep mode to the nominal mode of operation independently of whether the processor subsystem is in a sleep mode or a nominal mode of operation.

2. The integrated circuit of claim 1, wherein the WiFi subsystem AON-PM includes a state machine configured to assert a power enable signal to a power management integrated circuit (PMIC) to control the voltage for the WiFi subsystem core logic power rail and to control the voltage for the WiFi subsystem memory power rail.

3. The integrated circuit of claim 2, wherein a retention value for the voltage for the WiFi subsystem core logic power rail during the sleep mode of operation for the WiFi subsystem is different from a retention value for the voltage for the WiFi subsystem memory power rail.

4. The integrated circuit of claim 2, wherein a nominal value for the voltage for the WiFi subsystem core logic power rail during the nominal mode of operation is different from a nominal value for the voltage for the WiFi subsystem memory power rail.

5. The integrated circuit of claim 1, wherein the WiFi subsystem includes a WLAN interface coupled to the WiFi subsystem core logic power rail through a head switch, and wherein the WiFi subsystem PMU is configured to switch off the head switch in preparation for a transition of the WiFi subsystem from the nominal mode of operation to the sleep mode of operation.

6. The integrated circuit of claim 5, further comprising:
a processor subsystem AON-PM in the AON power domain configured to control a voltage for the processor core logic power rail and a voltage for the processor memory power rail depending upon whether the processor subsystem is to transition to a sleep mode or to a nominal mode of operation; and
a resource power manager (RPM) in the processor subsystem, wherein the RPM is configured to transmit the wakeup period to the processor subsystem AON-PM prior to a transition of the processor subsystem to the sleep mode, and wherein the processor subsystem AON-PM is configured to time the wakeup period responsive to the sleep clock and to signal the end of the wakeup period to the RPM to begin a transition of the processor subsystem from the sleep mode to the nominal mode of operation.

7. The integrated circuit of claim 6, wherein the WiFi subsystem PMU is configured to switch on the head switch during a transition of the WiFi subsystem from the sleep mode to the nominal mode while the processor subsystem remains in a sleep mode, and wherein the WiFi subsystem PMU is further configured to switch off the head switch and transition the WiFi subsystem back to the sleep mode responsive to the WLAN interface determining that a received traffic indication map (TIM) signal is de-asserted.

8. The integrated circuit of claim 6, wherein the WiFi subsystem PMU is further configured to switch on the head switch during a transition of the WiFi subsystem from the sleep mode to the nominal mode while the processor subsystem remains in a sleep mode, and wherein the RPM is further configured to transmit an interrupt to the processor subsystem AON-PM to trigger a transition of the processor subsystem to the nominal mode responsive to the WLAN interface determining that a received traffic indication map (TIM) signal is asserted.

9. The integrated circuit of claim 8, further comprising a level shifter configured to level shift the interrupt from the WiFi subsystem PMU prior to its receipt at the processor subsystem AON-PM.

\* \* \* \* \*